(12) United States Patent
Tummala et al.

(10) Patent No.: US 12,518,246 B2
(45) Date of Patent: Jan. 6, 2026

(54) PROCESSING MESSAGES IN A MULTI-TIER ENVIRONMENT

(71) Applicant: SAP SE, Walldorf (DE)

(72) Inventors: Venkata Tummala, San Jose, CA (US); Margherita Monni, San Jose, CA (US); Sowmya Sampath, San Jose, CA (US); Vanishree Malagi, San Jose, CA (US)

(73) Assignee: SAP SE, Walldorf (DE)

( * ) Notice: Subject to any disclaimer, the term of this patent is extended or adjusted under 35 U.S.C. 154(b) by 554 days.

(21) Appl. No.: 17/850,694

(22) Filed: Jun. 27, 2022

(65) Prior Publication Data

US 2023/0419254 A1    Dec. 28, 2023

(51) Int. Cl.
*G06Q 10/0875* (2023.01)
*G06Q 10/0631* (2023.01)

(52) U.S. Cl.
CPC ..... *G06Q 10/0875* (2013.01); *G06Q 10/0631* (2013.01)

(58) Field of Classification Search
CPC ............... G06Q 10/0875; G06Q 10/0631
See application file for complete search history.

(56) References Cited

U.S. PATENT DOCUMENTS

| | | | |
|---|---|---|---|
| 6,983,278 B1 * | 1/2006 | Yu | G06F 21/6218 707/999.009 |
| 10,915,851 B2 | 2/2021 | Tummala et al. | |
| 2001/0042059 A1 * | 11/2001 | Uehara | G06Q 10/0875 |
| 2002/0072988 A1 | 6/2002 | Aram | |
| 2002/0116241 A1 | 8/2002 | Sandhu et al. | |
| 2002/0178077 A1 | 11/2002 | Katz et al. | |
| 2003/0033179 A1 | 2/2003 | Katz et al. | |
| 2003/0074282 A1 | 4/2003 | Lee | |
| 2006/0149639 A1 | 7/2006 | Liu et al. | |
| 2008/0249901 A1 | 10/2008 | Hosalli et al. | |
| 2020/0082336 A1 * | 3/2020 | Vuppala | G06Q 10/0875 |
| 2020/0160238 A1 | 5/2020 | Tummala et al. | |

OTHER PUBLICATIONS

Brockhoff, "Analyzing Multi-level BOM-Structured Event Data", Mar. 2022, https://link.springer.com/chapter/10.1007/978-3-030-98581-3_4 (Year: 2022).*

Preiss, "Add-On BOM Browser improved", Jul. 2021, https://www.preiss-sap-consulting.de/en/category/blog-en/ (Year: 2021).*

"U.S. Appl. No. 16/195,799, Non Final Office Action mailed Jul. 20, 2020", 13 pgs.

(Continued)

*Primary Examiner* — Allen C Chein

(74) *Attorney, Agent, or Firm* — SCHWEGMAN LUNDBERG & WOESSNER, P.A.

(57) ABSTRACT

In an example embodiment, a multi-tier solution is provided in a system that will solve the visibility and bottleneck identification issues faced by manufacturers who produce finished items in a system while the same or separate system is used to procure one or more components used to produce the finished items. More particularly, the multi-tier solution uses multi-tier data to give the user a view of a finished item material and all of its components in one screen/view.

20 Claims, 9 Drawing Sheets

(56) References Cited

OTHER PUBLICATIONS

"U.S. Appl. No. 16/195,799, Notice of Allowance mailed Nov. 9, 2020", 10 pgs.
"U.S. Appl. No. 16/195,799, Notice of Allowance mailed Dec. 7, 2020", 5 pgs.
"U.S. Appl. No. 16/195,799, Response filed Sep. 8, 2020 to Non Final Office Action mailed Jul. 20, 2020", 13 pgs.

* cited by examiner

HOME  ENABLEMENT  WORKBENCH  PLANNING ∨  ORDERS∨  FULFILLMENT∨  QUALITY∨  INVOICES∨  PAYMENTS∨  CATALOGS  REPORTS∨

PLANNING:28CT HALLOWEEN VARIETY PACK
PLANT 0001. HOUSTON TX
CUSTOMER                SUPPLIER PART NO.        DESCRIPTION
BEVERAGECO.             1322                     PLANNING:28CT HALLOWEEN VARIETY PACK

MULTI-TIER VISIBILITY RECORDS

∨ FILTER

VIEW BY [DAILY ∨]   STARTING FROM [11/18/2021]        LAST SENT 16 NOV, 2021   [SEND DATA]   ↻

| KEY FIGURE | 18 NOV 2021 | 19 NOV 2021 | 20 NOV 2021 | 21 NOV 2021 | 22 NOV 2021 | 23 NOV 2021 | 24 NOV 2021 | 25 NOV 2021 | 26 NOV 2021 | 27 NOV 2021 |
|---|---|---|---|---|---|---|---|---|---|---|
| ∨ FINISHED GOODS 28CT HALLOWEEN VARIETY PACK STOCK ON HAND 550 | | | | | | | | | | |
| FIRMED ORDERS (INBOUND) | 1800 | 2200 | 1500 | 1900 | 1400 | 2800 | 1800 | 2100 | 1500 | 1300 |
| FIRMED ORDERS (OUTBOUND) | 1800 | 2200 | 1500 | 1900 | 1400 | 2800 | 1800 | 2100 | 1500 | 1300 |
| TRANSPORT ORDERS (INBOUND) | 1800 | 2200 | 1500 | 1900 | 1400 | 2800 | 1800 | 2100 | 1500 | 1300 |
| TRANSPORT ORDERS (OUTBOUND) | 1800 | 2200 | 1500 | 1900 | 1400 | 2800 | 1800 | 2100 | 1500 | 1300 |
| COPY PURCHASE ORDERS (INBOUND) | 1800 | 2200 | 1500 | 1900 | 1400 | 2800 | 1800 | 2100 | 1500 | 1300 |
| COPY TRANSPORT ORDERS (INBOUND) | 1800 | 2200 | 1500 | 1900 | 1400 | 2800 | 1800 | 2100 | 1500 | 1300 |
| BEGINNING INVENTORY | 1800 | 2200 | 1500 | 1900 | 1400 | 2800 | 1800 | 2100 | 1500 | 1300 |
| ENDING INVENTORY | 1800 | 2200 | 1500 | -300 | 1400 | -800 | 1800 | 2100 | 1500 | 1300 |
| COMPONENTS WITH SHORTAGE | | | | 2 | | 1 | | | | |
| COMPONENT 000101-CLASSIC CHIPS STOCK IN HAND 150 | | | ⚠ (2) | | | | | | | |
| COMPONENT 000102-CORN CHIPS STOCK IN HAND 120 | | | ⚠ (2) | | | | | | | |

PROCESSING MESSAGES IN A MULTI-TIER ENVIRONMENT

BRIEF DESCRIPTION OF DRAWINGS

The present disclosure is illustrated by way of example and not limitation in the figures of the accompanying drawings, in which like references indicate similar elements and in which:

FIG. 6 is a screen capture illustrating another user interface for displaying multi-tier planning information from an ERP, in accordance with an example embodiment.

DETAILED DESCRIPTION

The description that follows includes illustrative systems, methods, techniques, instruction sequences, and computing machine program items that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

ERP software generally provides both inventory and estimate management tools for both suppliers and buyers. These systems provide, for example, screens showing particular information (also called views) about a business relationship. Such ERP software systems are limited, however, in that they are unable to provide visibility of availability of both a finished good and the components used in manufacturing the finished good in a single view. More particularly, technical limitations in ERP systems prevent them from knowing which components were used for which finished goods and in what quantity they were used to manufacture the finished goods, which in turn prevents views from presenting anything other than availability information at a single level in a finished good/component hierarchy.

In an example embodiment, a multi-tier planning solution is provided in an ERP system that will solve the visibility and bottleneck identification issues faced by manufacturers who produce finished goods that are to be sold via an ERP system while the same or separate ERP system is used to procure one or more components used to produce the finished goods. More particularly, the multi-tier planning solution uses multi-tier data to give the buyer a planning view of a finished good material and all of its components in one screen/view.

The multi-tier planning records may be created using a bill of materials (BOM) to display parent/child material relationships.

Figure 1:
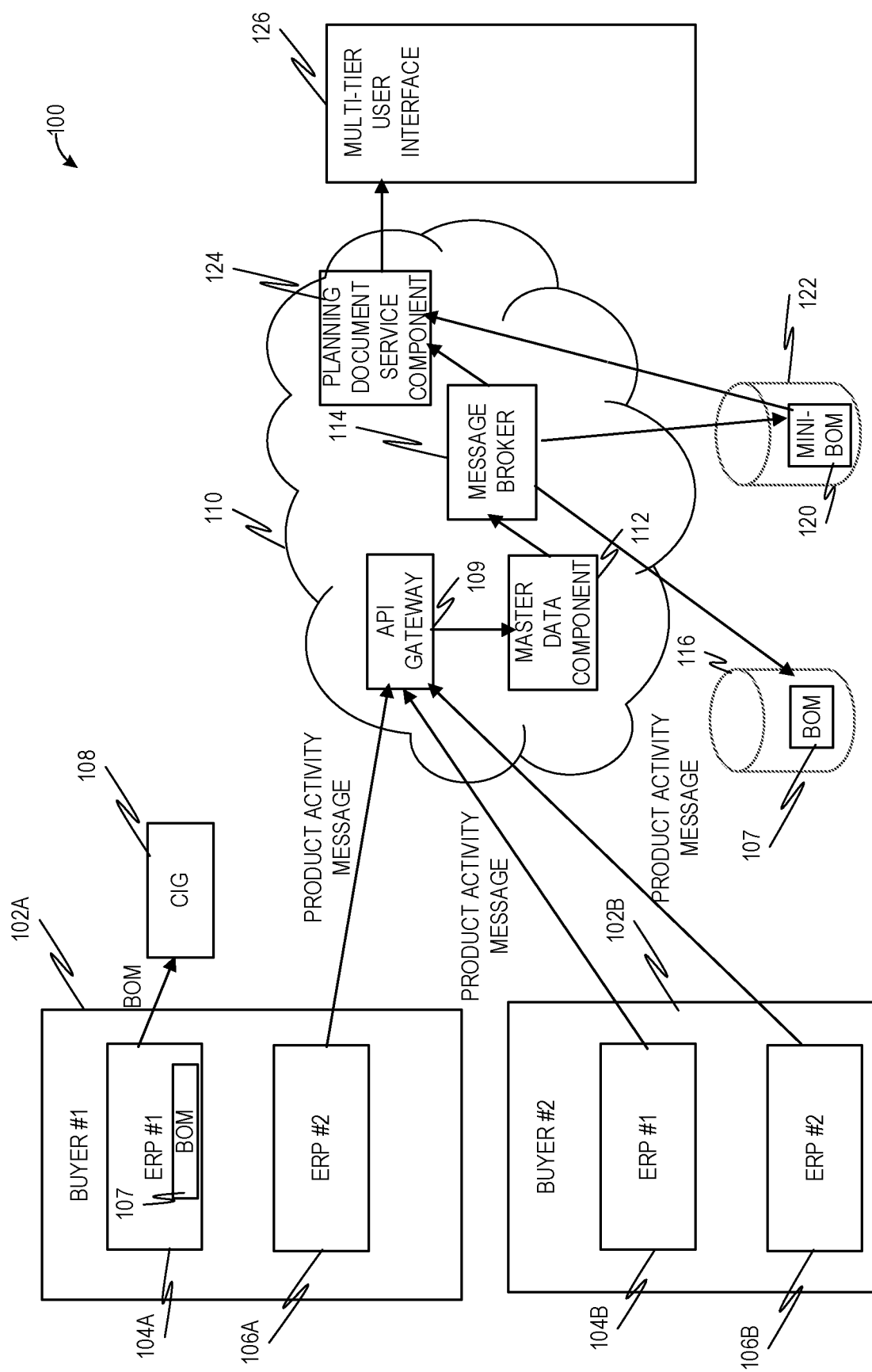
FIG. 1 is a block diagram of an application system, in accordance with an example embodiment.

FIG. 1 is a block diagram of an application system 100, in accordance with an example embodiment. Here, the application system 100 comprises a first buyer 102A and a second buyer 102B. The first and second buyers 102A, 102B each represent a different business entity potentially purchasing a part, item, or service (hereinafter all generally referred to as an "item") offered by a supplier (not pictured). The first and second buyers 102A, 102B may each also be manufacturers or other entities that take the item and sell a finished item using the purchased item. For example, the first and second buyers 102A, 102B may take a physical item and use it in building a finished good. Alternatively, the first and second buyers 102A, 102B may take a non-physical item, such as an electronic news article, and use it in assembling a finished non-physical item, such as an online newspaper.

The first and second buyers 102A, 102B each host a first ERP system 104A, 104B and a second system ERP 106A, 106B. This is merely for illustrative purposes; in reality, each buyer 102A, 102B may host any number of one or more ERP systems. In this example, the first ERP system 104A, 104B is dedicated to estimating while the second ERP system 106A, 106B is dedicated to inventory management. It should be noted that there may be more than one ERP system dedicated to inventory management and/or more than one ERP system dedicated to estimating operated by a single business entity, such as buyer 102A. For example, multiple inventory management ERPs for a single business entity may represent different manufacturing plants.

In the case where an ERP, such as the first ERP 104A for the first buyer 102A, is used to purchase items used to make finished items, it may also maintain a BOM 107 for each such finished good. The BOM 107 is a recipe indicating how many of each component is needed to make a single finished good. Thus, for example, if the finished item is a variety pack of 12 bags of chips, the BOM 107 for this finished item may indicate that each variety pack contains 3 bags of BBQ flavor chips, 3 bags of sweet onion flavor chips, 3 bags of salt and vinegar flavor chips, and 3 bags of plain chips. The BOM 107, therefore, may be organized as a hierarchy, with the finished item at the top of the hierarchy and each component and/or sub-component on a lower level of the hierarchy. In the simple case, as with the variety bag of chips, the hierarchy only has two levels, but any number of levels may be present in the hierarchy in more complex scenarios. For example, if the entity operating the first ERP 104A not only assembles the variety pack of chips but also makes the chips themselves, then a third level of the hierarchy may indicate which raw ingredients are used to make the bags of chips themselves (and perhaps an indication of the identification of the bags themselves, which may be purchased from suppliers).

The first ERP 104A may then send the BOM 107 to a cloud integration gateway (CIG) 108. In an example embodiment, the BOM 107 may be sent in the form of a Simple Object Access Protocol (SOAP) message, which is an extensible markup language (XML) document that comprises a SOAP envelope, an optional OAP header, and a SOAP body. The CIG 108 converts the SOAP message to JavaScript Object Notation (JSON) and posts it to an application program interface (API) gateway 109 located in a cloud application provider 110.

Additionally, in an example embodiment, this transmission may also include an identifier of the ERP component that generated it. In this case, the identifier would uniquely identify the first ERP system 104A (as distinguished from second the ERP system 106A or even from the first ERP system 104B). The identifier may also contain an identification of the item to which it applies. Since some customers may have an extremely high volume of data, a master data component 112 posts the BOM into a message broker 114 in order to maintain quick user interface response times. This message broker 114 may be a distributed messaging system, such as Kafka, which provides fast, highly scalable, and redundant messaging through a publish-subscribe model. In a publish-subscribe model, asynchronous communication technology is used such that any message published to a topic is immediately received by all subscribers to the topic. Other desirable attributes of such a messaging system include allowing a large number of permanent or ad-hoc nodes while, at the same time, being highly available and resilient to node failures and supporting automatic recovery.

A database 116 subscribes to the message broker 114, and specifically to a topic to which the BOM 107 will be posted, and thus receives the BOM 107 when it is posted in the message broker 114. The database 116 may then store both the BOM 107 and the accompanying information. In an example embodiment, the database 116 may be a database that does not utilize structured query language (SQL) (also known as a NoSQL database). This database 116 may be optimized for storing graphs, since in an example embodiment, a graph structure is used to store the BOM 107.

Figure 2:
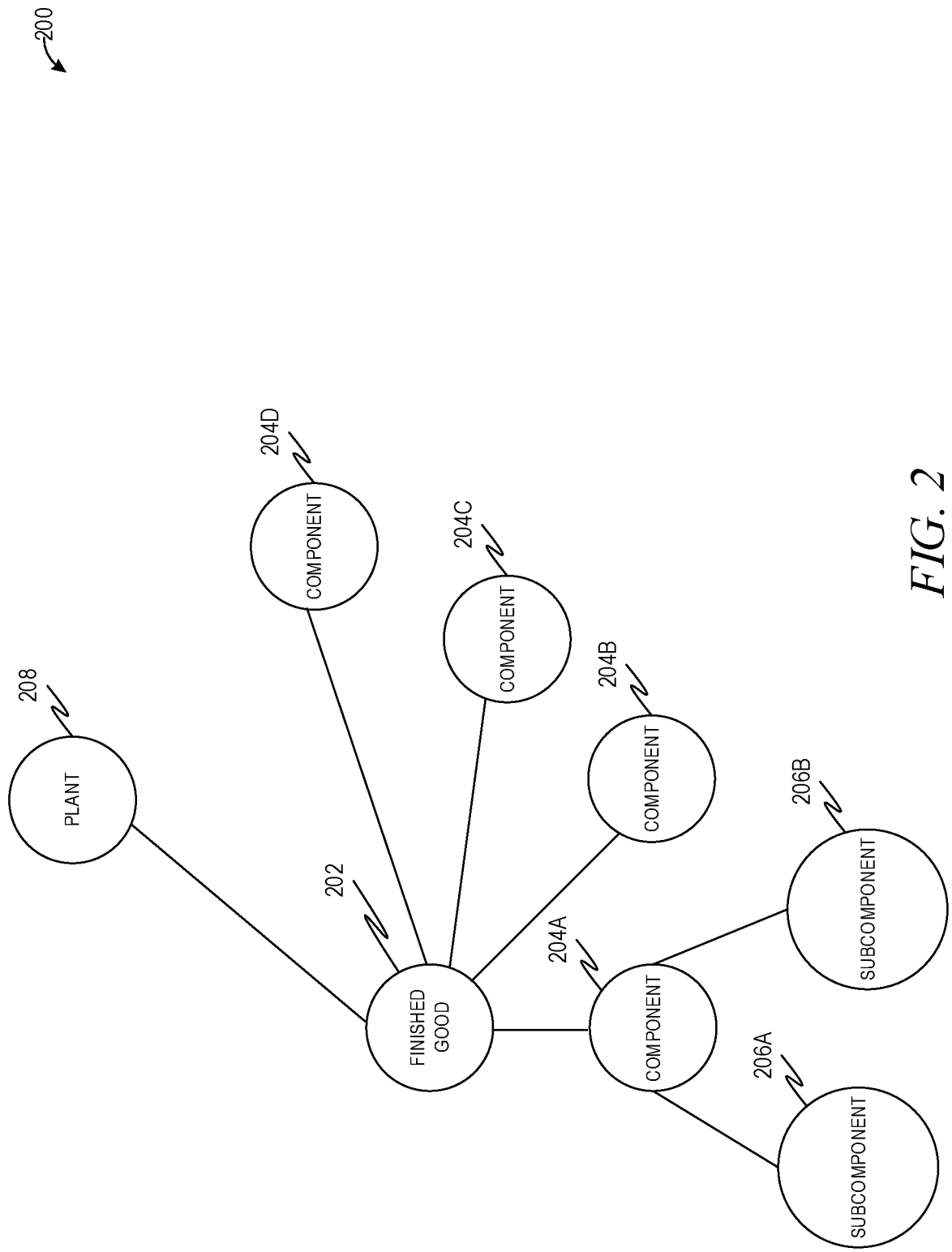
FIG. 2 is a diagram illustrating an example graph structure, in accordance with an example embodiment.

FIG. 2 is a diagram illustrating an example graph structure 200, in accordance with an example embodiment. Here, the graph structure includes a finished good node 202, which contains edges to each of a plurality of components 204A-204D used to manufacture the corresponding finished good. One or more of these components 204A-204D may also contain edges to each of one or more subcomponents used to manufacture the corresponding component. Here, for example, component 204A has an edge to subcomponents 206A and 206B, indicating that subcomponents 206A, 206B are used to make component 204A, which is used to make finished good 202.

Also depicted is a plant node 208. Linking the plant node 208 to the finished good node 202 indicates that the finished good is manufactured at the plant corresponding to the plant node 208. This allows, for example, for there to be different recipes for the same finished good for different plants at which the finished good is produced.

Referring back to FIG. 1, the master data component 112 also creates another data structure, called a Mini-BOM 120, and stores the Mini-BOM 120 in database 122. In an example embodiment, the database 122 is an in-memory database. An in-memory database is a database management system that primarily relies on main memory for computer data storage. It is contrasted with database management systems that employ a disk storage mechanism.

The Mini-BOM 120 is a limited version of the BOM 107 that is stored in planning tables. Planning tables are data structures with data used for planning purposes in an ERP. The Mini-BOM 120 is used during processing of product activity messages to determine if an item is a finished good or component (or both) and populate appropriate key figures. A key figure is a data value about a good or component stored by a database. The determination of whether an item is a finished good or a component can affect how those key values are populated, such as if an item is a component and lists a 3 month delay on availability, then the corresponding finished good may also need to have a delay reflected.

In order to avoid storing redundant BOM 107 data within planning tables, only those parts which have a product activity message posted will have the related BOM 107 data stored within the Mini-BOM and planning tables. This will also ensure that the BOM is only stored in those supplier communities for a given buyer that also have a product activity message posted.

In an example embodiment, the Mini-BOM 120 is stored as a table (within the planning tables), with the following format:

ID: DECIMAL
BUYER_ORG: DECIMAL
PLANNING_ITEM_ID: DECIMAL
PARENT: DECIMAL (points to row in same table)
MATERIAL: VARCHAR (corresponds to buyer part id)
PLANT: DECIMAL
QUANTITY: DECIMAL
UOM: VARCHAR
VALIDITY_FROM: DATE
VALIDITY_TO: DATE
CXML_DOC_ID: DECIMAL
LEVEL: DECIMAL The ERP systems 104A, 104B, 106A, 106B may, at any point, issue product activity messages or product replenishment messages. A product activity message is a message sent to share planning data, such as time-series data format (date and quantity) from a buyer to a supplier. A product replenishment message is a message sent to share planning data from a supplier to a buyer, such as when a shipment is made of a component. These product activity messages and product replenishment messages are captured by the API Gateway 109 and posted to the message broker 114 by the master data component 112. A planning document service component 124 then asynchronously pulls the product activity message or product replenishment message and performs one or more actions on the Mini-BOM 120 in the database 122.

For a product activity message, the product activity message may either be received before the corresponding BOM is first received or after. In the scenario where the BOM is received prior to any product activity message corresponding to a component or finished good in the BOM, a BOM create message is received first. No action needs to be taken by the planning document service component 124 in response to this. Once a product activity message is received, however, the corresponding BOM 107 is pulled from database 116 and some of the BOM 107 is inserted into the Mini-BOM 120. If the product activity message pertains to a finished good, then all components of that finished good in the BOM 107 are inserted into the Mini-BOM 120. If the product activity message pertains to a component, then the component is inserted into the Mini-BOM 120 if it is not already present in it. If it is present, then a planning item identification in all finished goods for the component that are present in the Mini-BOM are updated. Any finished good for the component not already present in the Mini-BOM 120 will not be inserted at this point.

When the BOM 107 is updated, the Mini-BOM 120 is updated with added/deleted components. When a product activity message is updated, and if the item it pertains to is present in the Mini-BOM, the portion of the Mini-BOM pertaining to that item is retrieved. If it was present without a parent (i.e., it is a finished good), then one or more key figures for finished goods are updated. If it is present with a parent (i.e., it is a component), then one or more component key figures are updated. If it is present both with and without a parent, then one or more key figures for finished goods and one or more component key figures are updated.

In the scenario where the BOM 107 is first received after a product activity message corresponding to a component or finished good in the BOM, then that means that a product activity create message is received first. In response to the product activity create message, a forecast item may be created. Then, once the BOM create message is received, the finished good corresponding to the received product activity message (i.e., the one that has a forecast item created for it) and components from the BOM are inserted into the Mini-BOM 120. If a component does not have a planning item, then only the material/plant information may be inserted at this point.

When the product activity message is updated, the portion of the Mini-BOM pertaining to the item corresponding to the product activity message is retrieved. If it is a finished good, then key figures for finished goods are updated. If it is a component, then component key figures are updated. If both, then one or more key figures for finished goods and one or more component key figures are updated.

A multitier user interface 126 is then able to render a new view for a user that includes multitier information in a single view. Specifically, planning items for items contained in a Mini-BOM may be aggregated and used to render the single view that contains information about multiple levels of the hierarchy. Thus, for example, rather than a user only being able to view finished good inventory in one view and component inventory in another view, a single view can be provided where the user can view both finished good and component inventory at the same time.

In an example embodiment, this single view includes a finished good section, including an order forecast and a forecast commit, and a component section, including an order forecast and a forecast commit. Stock on hand can use existing inventory fields for the forecast.

Figure 3:
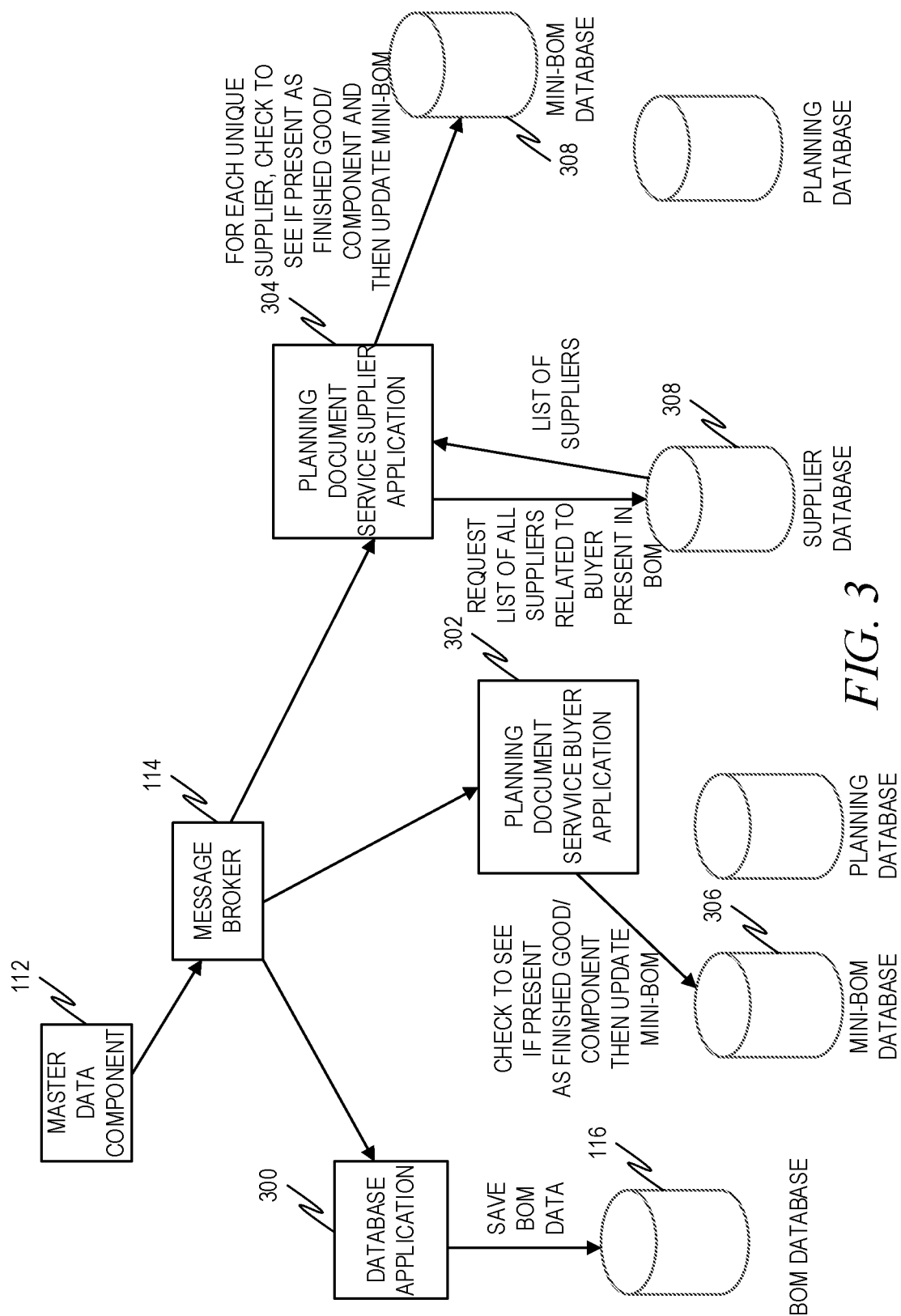
FIG. 3 is a block diagram illustrating actions of a master data component, in accordance with an example embodiment.

FIG. 3 is a block diagram illustrating actions of a master data component 112 in accordance with an example embodiment. Here, master data component 112 produces messages posted to message broker 114. These messages are shown as being consumed by three services. The first is a database application 300. The second is a planning document service buyer application 302. The third is a planning document service supplier application 304. The database application 300 stores a BOM posted by the master data component 112 in a database, such as database 116 of FIG. 1.

When an activity message is posted, the planning document service buyer application 302 checks to see if an item referenced by the message is present as a finished good or a component, and then updates a mini-BOM in a mini-BOM database 306, in accordance with that. The planning document service supplier application 304 request a list of all suppliers related to the buyer in the BOM, from a supplier database 308, and then, for each unique supplier community, checks to see if the item referenced by the message is present as a finished good or component and updates the mini-BOM in the mini-BOM database 308 in accordance with that.

More generally, when receiving a product activity message, such as one with forecast data in it for a given material/location combination, corresponding planning data should be associated with the correct multi-tier section: a given material may be a finished good, component, or both. The correct association may be made using the BOM data. The BOM data is obtained from the customer ERP and is not assigned to a specific supplier.

Thus, for example, if a forecast arrives for Material with ID "Sack" at plant 1000, the system may match the material and plant ID combination with BOM header material such as the following:
BOM:0001
Header Material:Sack
Plant ID:1000, 2000
Components:
>BBQ Chips
>Cheese Chips The system may then create a finished good record and populate the finished good section planning data using the forecast.

In another example, a forecast may arrive for a material with ID "Cheese Chips" at plant 1000. Since this is listed as a component in the above BOM, then a component record for "Cheese Chips" under the finished good record "Sack/1000" is created and the component section planning data is populated.

Assume there is a second BOM, however, as follows:
BOM:0002
Header Material:Party Pack
Plant ID:2000, 3000
Components:
>BBQ Chips
>Cheese Chips
>Plain Chips Then assume that a forecast arrives for material BBQ chips at plant 2000. Notably, this is a component both of the Sack finished good from the first BOM and the Party Pack finished good from the second BOM. As such, a component record "BBQ Chips" is created under the finished good "Sack" from the first BOM and under the finished good "Party Pack" from the second BOM.

Assume there is a third BOM as follows:
BOM:0003
Header Material: Shoppable pallet
Plant ID: 3000
Components:
>Party pack
>Salsa Notably, this BOM indicates that Party pack, which was described as a finished good in the second BOM, is here indicated as a component. Then assume that a forecast arrives for material "Party pack" at plant 3000. A finished good record for party pack/3000 is created and a finished good section is populated with the planning data. While this planning data also matches as a component in the third BOM, no action is taken at the moment since a corresponding finished good record (Shoppable pallet) does not exist yet.

When a forecast for shoppable pallet at plant 3000 is received later, it can then be matched with the third BOM and a finished good record is created for the shoppable pallet/3000 combination and populated with the planning data. The previously received party pack/3000 data is then also visible under the multi-tier record for the shippable pallet, as a component.

Figure 4:
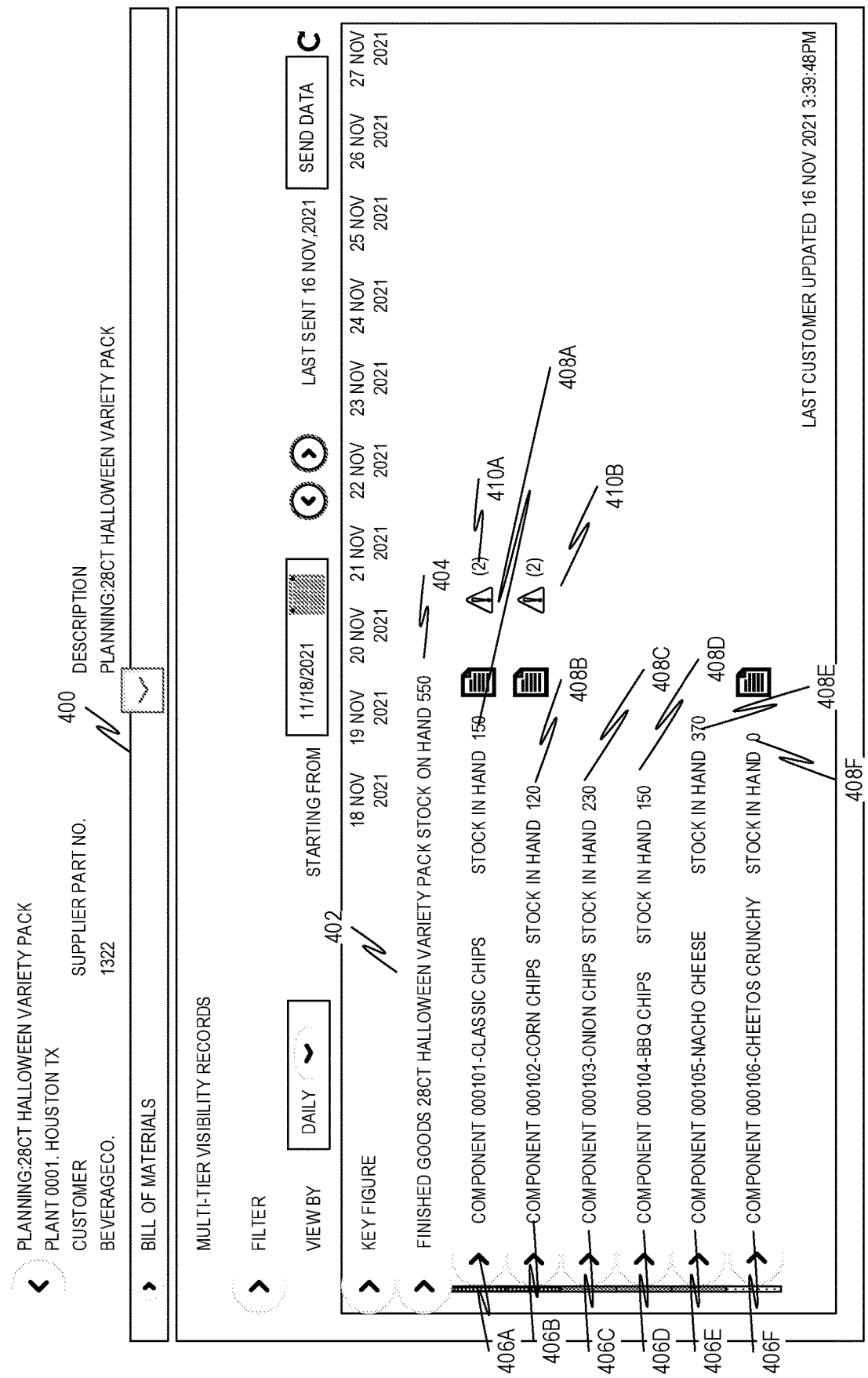
FIG. 4 is a screen capture illustrating a user interface for displaying multi-tier planning information from an Enterprise Resource Planning (ERP) system, in accordance with an example embodiment.

FIG. 4 is a screen capture illustrating a user interface 400 for displaying multi-tier planning information from an ERP, in accordance with an example embodiment. Here, the user interface 400 depicts a view of inventory figures of finished goods and components. More particularly, finished good 402 may have its total inventory 404 displayed, and each component 406A-406F of the finished good 402 may simultaneously have its own inventory 408A-408F displayed. Notably, planning information from the planning document may be used to identify when inventory levels of a component 406A-406F are too low. For example, inventory levels 408A and 408B may be flagged as low, given information from the planning document indicating that more than that amount of the corresponding components 406A, 406B will be needed within the next week. A corresponding flag 410A, 410B may be displayed alerting the user to this fact.

Figure 5:
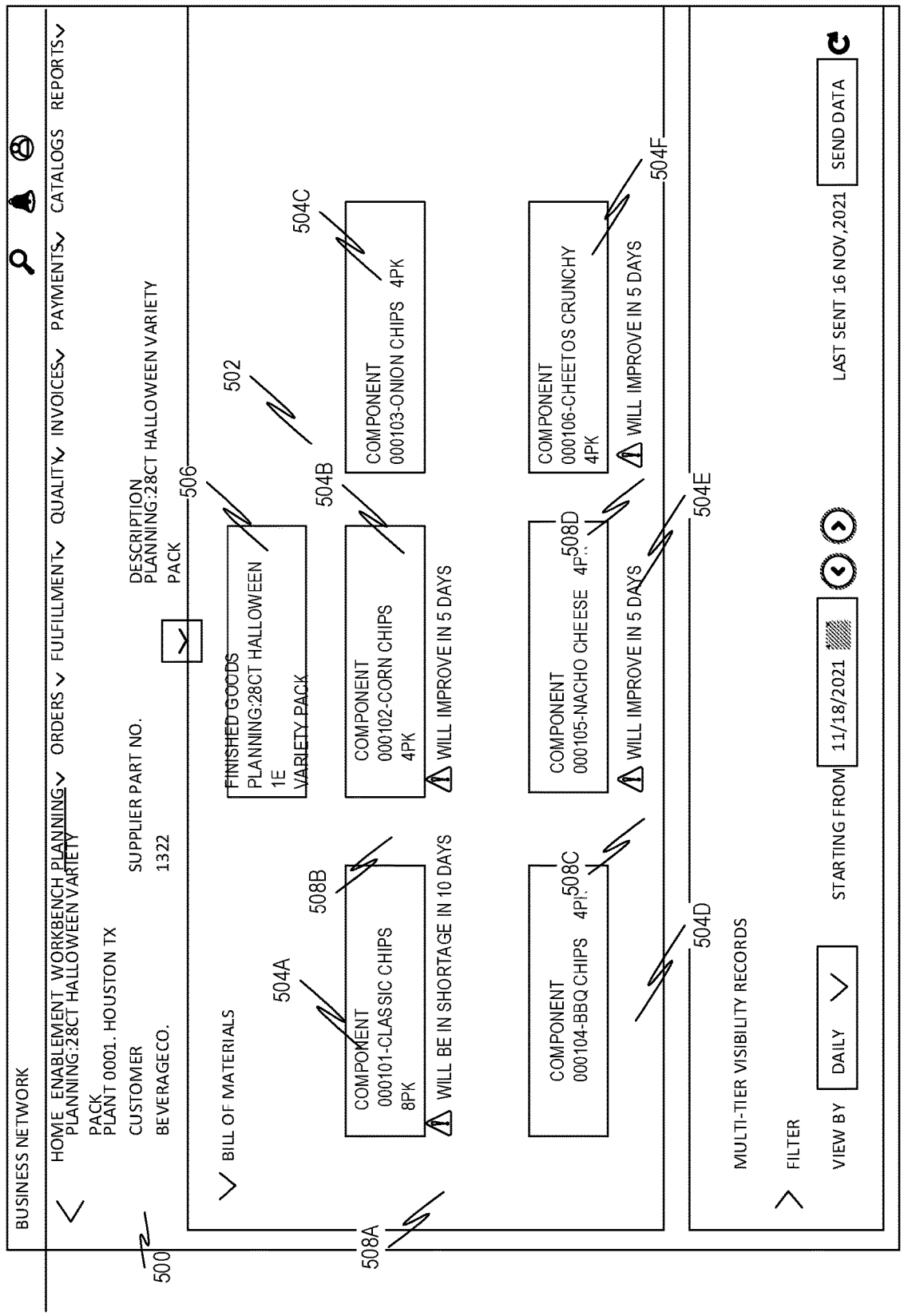
FIG. 5 is a screen capture illustrating another user interface for displaying multi-tier planning information from an ERP, in accordance with an example embodiment.

FIG. 5 is a screen capture illustrating another user interface 500 for displaying multi-tier planning information from an ERP, in accordance with an example embodiment. Here, the user interface 500 displays the hierarchy 502 of the bill of materials itself, and specifically a graphical depiction of all the components 504A-504F of a particular finished good 506. Alerts regarding inventory levels may also be displayed in this user interface. For example, alert 508A indicates that component 504A will have a shortage in 10 days, alert 508B indicates that component 504B will have inventory levels improve in 3 days, alert 508C indicates that component 504E will have inventory levels improve in 5 days, and alert 508D indicates that component 504F will have its inventory levels improve in 5 days.

FIG. 6 is a screen capture illustrating another user interface 600 for displaying multi-tier planning information from an ERP, in accordance with an example embodiment. Here, the user interface 600 displays various key figures about a finished good 602, organized by type of key figure and by date of the corresponding values. For example, from this user interface 600 the user can see that there were 1800 firmed orders (inbound) on November 18$^{th}$ from value 604 and can see that there were 2200 firmed orders (inbound) on November 19$^{th}$ from value 606.

Key figures regarding components 608A, 608B can also be displayed, here being inventory numbers 610A, 610B.

Figure 7:
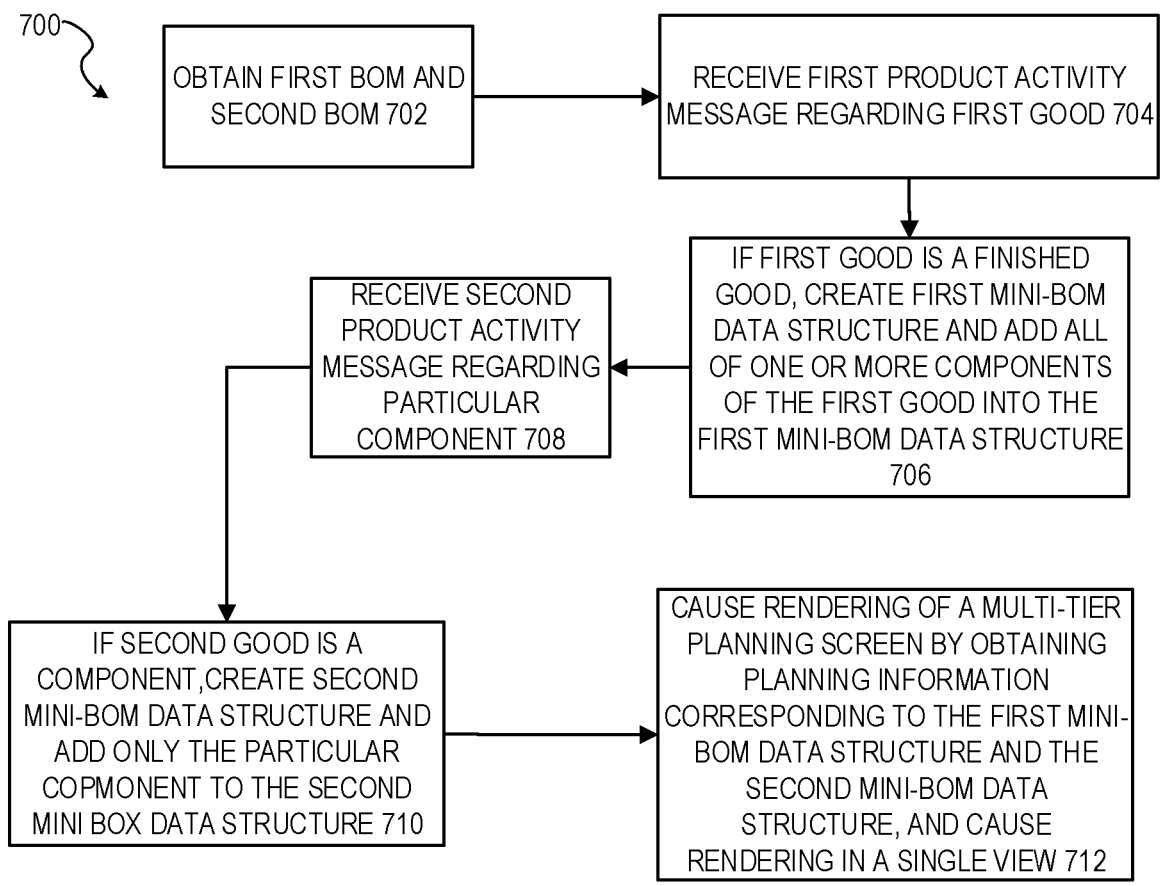
FIG. 7 is a flow diagram illustrating a method for creating and causing rendering of a multi-tier planning information in a user interface, in accordance with an example embodiment.

FIG. 7 is a flow diagram illustrating a method 700 for creating and causing rendering of a multi-tier planning information in a user interface, in accordance with an example embodiment. At operation 702, a first BOM and a second BOM are obtained, generated by an ERP system. The first BOM contains hierarchical data regarding a first finished good and one or more components of the first finished good. The second BOM contains hierarchical data regarding a second finished good and one or more components of the second finished good.

At operation 704, a first product activity message regarding the first good is received. At operation 706, in response to the receiving the first product activity message and a determination that the first product activity message corresponds to a finished good, a first mini-BOM data structure is created and all of the one or more components of the first finished good from the first BOM are added into the first mini-BOM data structure.

At operation 708, a second product activity message regarding a particular component of the one or more components of the second finished good is received. At operation 710, in response to the receiving the second product activity message and a determination that the second product activity message corresponds to a component, a second mini-BOM data structure is created and only the particular component from the second BOM is added into the second mini-BOM data structure.

At operation 712, rendering of a multi-tier planning screen is caused by obtaining planning information corresponding to the first mini-BOM data structure and the second mini-BOM data structure and causing rendering of the planning information in a single view of a user interface.

In view of the disclosure above, various examples are set forth below. It should be noted that one or more features of an example, taken in isolation or combination, should be considered within the disclosure of this application.

EXAMPLES

Example 1. A system comprising:
at least one hardware processor; and
memory storing an application executable by the at least one hardware processor of the system to perform operations comprising:
obtaining a first data structure and a second data structure, generated by a first system, the first data structure containing hierarchical data regarding a first finished item and one or more components of the first finished item, the second data structure containing hierarchical data regarding a second finished item and one or more components of the second finished item;
receiving a first message regarding the first finished item;
in response to the receiving the first message and a determination that the first message corresponds to a finished item, creating a first mini-data structure and adding all of the one or more components of the first finished item from the first data structure into the first mini-data structure;
receiving a second message regarding a particular component of the one or more components of the second finished item;
in response to the receiving the second message and a determination that the second message corresponds to a component, creating a second mini-data structure and adding only the particular component from the second data structure into the second mini-data structure; and
causing rendering of a screen by obtaining planning information corresponding to the first mini-data structure and the second mini-data structure and causing rendering of the planning information in a single view of a user interface.

Example 2. The system of Example 1, wherein the first message includes planning information regarding the first finished item, and wherein the operations further comprise saving the planning information regarding the first finished item in a database.

Example 3. The system of Example 2, wherein the database is an in-memory database.

Example 4. The system of Examples 2-3, wherein the operations further comprise:
receiving a third message regarding the first finished item; and
updating the saved planning information regarding the first finished item with information from the third message.

Example 5. The system of any of claims 1-4, wherein the operations further comprise:
receiving a fourth message regarding a second component of the second finished item;

in response to the receiving of the fourth message, updating the second mini-data structure to include the second component of the second finished item from the second data structure.

Example 6. The system of any of claims 1-5, wherein the planning information includes inventory levels for finished items and components of finished items.

Example 7. The system of any of claims 1-6, wherein the first data structure is a first Bill of Material (BOM) data structure, the second data structure is a second BOM data structure, the first and second messages are product activity messages, the first mini-data structure is a first mini-BOM data structure, the second mini-data structure is a second mini-BOM data structure, and the first system is a first Enterprise Resource Planning system.

Example 8. A computerized method comprising:
obtaining a first data structure and a second data structure, generated by a first system, the first data structure containing hierarchical data regarding a first finished item and one or more components of the first finished item, the second data structure containing hierarchical data regarding a second finished item and one or more components of the second finished item;
receiving a first message regarding the first finished item;
in response to the receiving the first message and a determination that the first message corresponds to a finished item, creating a first mini-data structure and adding all of the one or more components of the first finished item from the first data structure into the first mini-data structure;
receiving a second message regarding a particular component of the one or more components of the second finished item;
in response to the receiving the second message and a determination that the second message corresponds to a component, creating a second mini-data structure and adding only the particular component from the second data structure into the second mini-data structure; and
causing rendering of a screen by obtaining planning information corresponding to the first mini-data structure and the second mini-data structure and causing rendering of the planning information in a single view of a user interface.

Example 9. The method of Example 8, wherein the first message includes planning information regarding the first finished item, and wherein the operations further comprise saving the planning information regarding the first finished item in a database.

Example 10. The method of Example 9, wherein the database is an in-memory database.

Example 11. The method of Examples 9 or 10, further comprising:
receiving a third message regarding the first finished item; and
updating the saved planning information regarding the first finished item with information from the third message.

Example 12. The method of any of Examples 8-11, wherein the operations further comprise:
receiving a fourth message regarding a second component of the second finished item;
in response to the receiving of the fourth message, updating the second mini-data structure to include the second component of the second finished item from the second data structure.

Example 13. The method of any of Examples 8-12, wherein the planning information includes inventory levels for finished items and components of finished items.

Example 14. The method of any of Examples 8-13, wherein the planning information includes projected usage of finished items and components of finished items.

Example 15. A non-transitory machine-readable storage medium comprising instructions, which when implemented by one or more machines, cause the one or more machines to perform operations comprising:
obtaining a first data structure and a second data structure, generated by a first system, the first data structure containing hierarchical data regarding a first finished item and one or more components of the first finished item, the second data structure containing hierarchical data regarding a second finished item and one or more components of the second finished item;
receiving a first message regarding the first finished item;
in response to the receiving the first message and a determination that the first message corresponds to a finished item, creating a first mini-data structure and adding all of the one or more components of the first finished item from the first data structure into the first mini-data structure;
receiving a second message regarding a particular component of the one or more components of the second finished item;
in response to the receiving the second message and a determination that the second message corresponds to a component, creating a second mini-data structure and adding only the particular component from the second data structure into the second mini-data structure; and
causing rendering of a screen by obtaining planning information corresponding to the first mini-data structure and the second mini-data structure and causing rendering of the planning information in a single view of a user interface.

Example 16. The non-transitory machine-readable storage medium of Example 15, wherein the first message includes planning information regarding the first finished item, and wherein the operations further comprise saving the planning information regarding the first finished item in a database.

Example 17. The non-transitory machine-readable storage medium of Example 16, wherein the database is an in-memory database.

Example 18. The non-transitory machine-readable storage medium of Example 16, wherein the operations further comprise:
receiving a third message regarding the first finished item; and
updating the saved planning information regarding the first finished item with information from the third message.

Example 19. The non-transitory machine-readable storage medium of any of Examples 15-18, wherein the operations further comprise:
receiving a fourth message regarding a second component of the second finished item;
in response to the receiving of the fourth message, updating the second mini-data structure to include the second component of the second finished item from the second data structure.

Example 20. The non-transitory machine-readable storage medium of any of Examples 15-19, wherein the planning information includes inventory levels for finished items and components of finished items.

Figure 8:
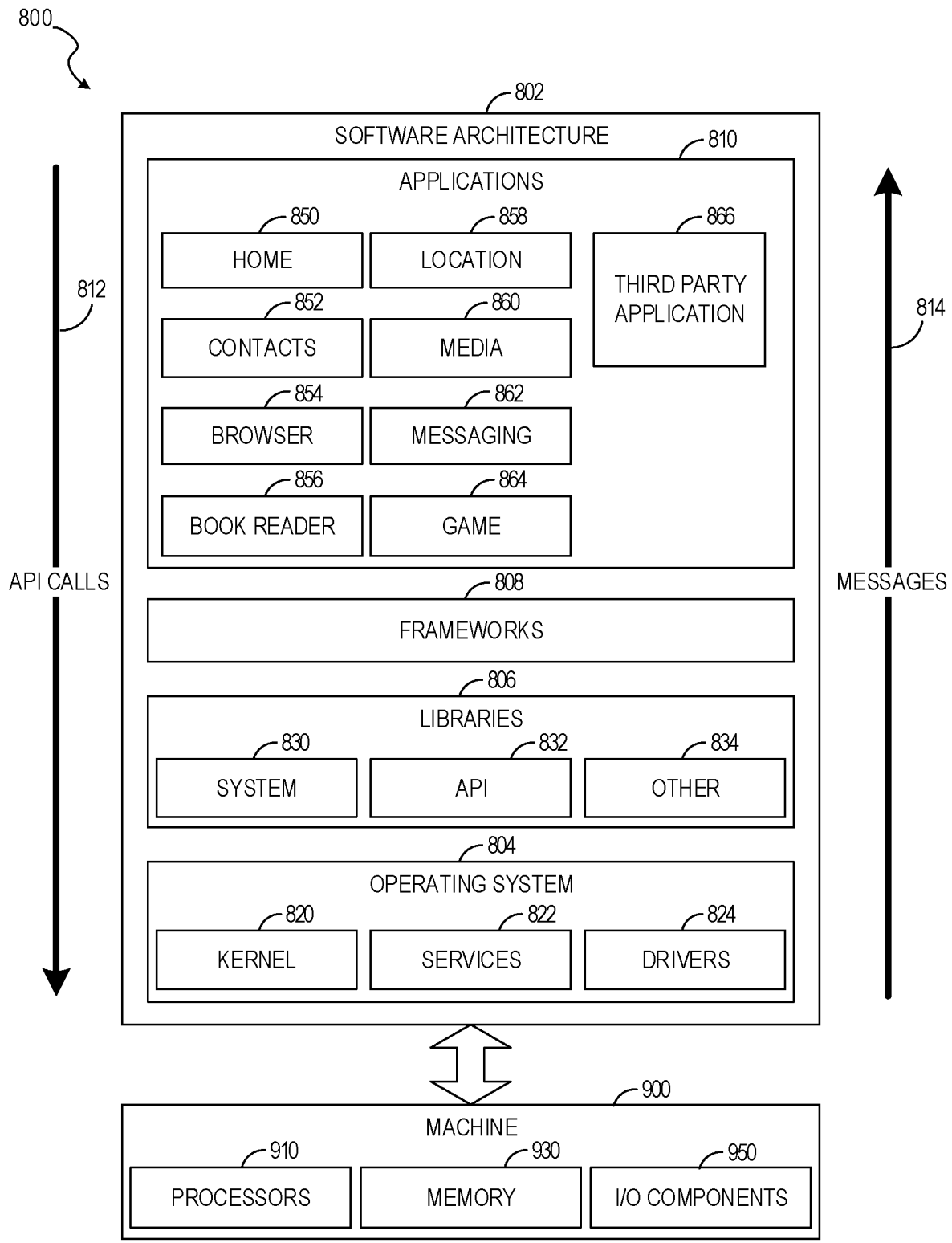
FIG. 8 is a block diagram illustrating an architecture of software, which can be installed on any one or more of the devices described above.

FIG. 8 is a block diagram 800 illustrating an architecture of software 802, which can be installed on any one or more of the devices described above. FIG. 8 is merely a non-limiting example of a software architecture, and it will be appreciated that many other architectures can be implemented to facilitate the functionality described herein. In various embodiments, the software 802 is implemented by hardware such as a machine 900 of FIG. 9 that includes processors 910, memory 930, and input/output (I/O) components 950. In this example architecture, the software 802 can be conceptualized as a stack of layers where each layer may provide a particular functionality. For example, the software 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphical user interface (GUI) functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-entity application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-entity application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-entity application 866 can invoke the API calls 812 provided by the operating system 804 to facilitate functionality described herein.

Figure 9:
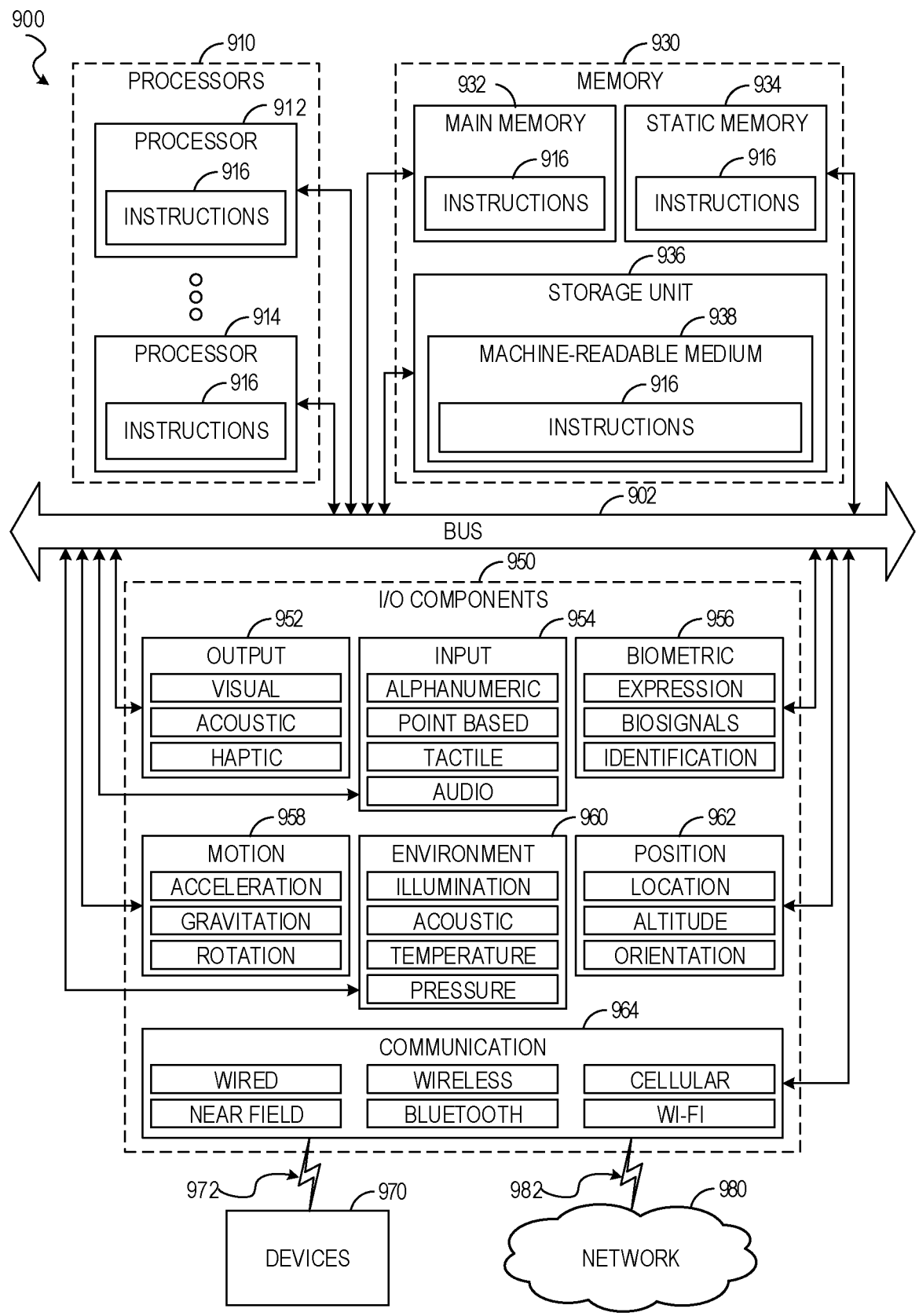
FIG. 9 illustrates a diagrammatic representation of a machine in the form of a computer system within which a set of instructions may be executed for causing the machine to perform any one or more of the methodologies discussed herein, according to an example embodiment.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the method 700 of FIG. 7. Additionally, or alternatively, the instructions 916 may implement FIGS. 1-7, and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions 916 contemporaneously. Although FIG. 9 shows multiple processors 910, the machine 900 may include a single processor 912 with a single core, a single processor 912 with multiple cores (e.g., a multi-core processor 912), multiple processors 912, 914 with a single core, multiple processors 912, 914 with multiple cores, or any combination thereof.

The memory 930 may include a main memory 932, a static memory 934, and a storage unit 936, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., coupled via a USB).

Moreover, the communication components 964 may detect identifiers or include components operable to detect identifiers. For example, the communication components 964 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

The various memories (i.e., 930, 932, 934, and/or memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   memory storing an application executable by the at least one hardware processor of the system to perform operations comprising:
   obtaining a first data structure and a second data structure, generated by a first system, the first data structure containing hierarchical data regarding a first finished item and one or more components of the first finished item, the second data structure containing hierarchical data regarding a second finished item and one or more components of the second finished item, the second finished item itself being a component of the first finished item;
   receiving a first message regarding the first finished item, the first message including planning data regarding the first finished item;
   in response to the receiving the first message and a determination that the first message corresponds to a finished item, creating a first mini-data structure and adding all of the one or more components of the first finished item from the first data structure into the first mini-data structure, the first mini-data structure stored in planning tables;
   receiving a second message regarding a particular component of the one or more components of the second finished item, the second message including planning data regarding the particular component;
   in response to the receiving the second message and a determination that the second message corresponds to a component, creating a second mini-data structure and adding only the particular component from the second data structure, and not any other components from the second data structure, into the second mini-data structure, the second mini-data structure stored in the planning tables; and
   causing rendering of a screen by obtaining planning information for the first finished item and all of the one or more components of the first finished item corresponding to the first mini-data structure and planning information for the particular component in the second mini-data structure and causing rendering of all the planning information in a single view of a user interface.

2. The system of claim 1, wherein the first message includes planning information regarding the first finished item; and wherein the operations further comprise saving the planning information regarding the first finished item in a database.

3. The system of claim 2, wherein the database is an in-memory database.

4. The system of claim 2, wherein the operations further comprise:
   receiving a third message regarding the first finished item; and
   updating the saved planning information regarding the first finished item with information from the third message.

5. The system of claim 1, wherein the operations further comprise:
   receiving a fourth message regarding a second component of the second finished item;
   in response to the receiving of the fourth message, updating the second mini-data structure to include the second component of the second finished item from the second data structure.

6. The system of claim 1, wherein the planning information includes inventory levels for finished items and components of finished items.

7. The system of claim 1, wherein the first data structure is a first Bill of Material (BOM) data structure, the second data structure is a second BOM data structure, the first and second messages are product activity messages, the first mini-data structure is a first mini-BOM data structure, the second mini-data structure is a second mini-BOM data structure, and the first system is a first Enterprise Resource Planning system.

8. A computerized method comprising:
   obtaining a first data structure and a second data structure, generated by a first system, the first data structure containing hierarchical data regarding a first finished item and one or more components of the first finished item, the second data structure containing hierarchical data regarding a second finished item and one or more components of the second finished item, the second finished item itself being a component of the first finished item;
   receiving a first message regarding the first finished item, the first message including planning data regarding the first finished item;
   in response to the receiving the first message and a determination that the first message corresponds to a finished item, creating a first mini-data structure and adding all of the one or more components of the first finished item from the first data structure into the first mini-data structure, the first mini-data structure stored in planning tables;
   receiving a second message regarding a particular component of the one or more components of the second finished item, the second message including planning data regarding the particular component;
   in response to the receiving the second message and a determination that the second message corresponds to a component, creating a second mini-data structure and adding only the particular component from the second data structure, and not any other components from the second data structure, into the second mini-data structure, the second mini-data structure stored in the planning tables; and
   causing rendering of a screen by obtaining planning information for the first finished item and all of the one or more components of the first finished item corresponding to the first mini-data structure and planning information for the particular component in the second mini-data structure and causing rendering of all the planning information in a single view of a user interface.

9. The method of claim 8, wherein the first message includes planning information regarding the first finished item; and
   wherein the method further comprises saving the planning information regarding the first finished item in a database.

10. The method of claim 9, wherein the database is an in-memory database.

11. The method of claim 9, further comprising:
    receiving a third message regarding the first finished item; and
    updating the saved planning information regarding the first finished item with information from the third message.

12. The method of claim 8, further comprising:
    receiving a fourth message regarding a second component of the second finished item;
    in response to the receiving of the fourth message, updating the second mini-data structure to include the second component of the second finished item from the second data structure.

13. The method of claim 8, wherein the planning information includes inventory levels for finished items and components of finished items.

14. The method of claim 8, wherein the planning information includes projected usage of finished items and components of finished items.

15. A non-transitory machine-readable storage medium comprising instructions, which when implemented by one or more machines, cause the one or more machines to perform operations comprising:
    obtaining a first data structure and a second data structure, generated by a first system, the first data structure containing hierarchical data regarding a first finished item and one or more components of the first finished item, the second data structure containing hierarchical data regarding a second finished item and one or more components of the second finished item, the second finished item itself being a component of the first finished item;
    receiving a first message regarding the first finished item, the first message including planning data regarding the first finished item;
    in response to the receiving the first message and a determination that the first message corresponds to a finished item, creating a first mini-data structure and adding all of the one or more components of the first finished item from the first data structure into the first mini-data structure, the first mini-data structure stored in planning tables;
    receiving a second message regarding a particular component of the one or more components of the second finished item, the second message including planning data regarding the particular component;
    in response to the receiving the second message and a determination that the second message corresponds to a component, creating a second mini-data structure and adding only the particular component from the second data structure, and not any other components from the second data structure, into the second mini-data structure, the second mini-data structure stored in the planning tables; and causing rendering of a screen by obtaining planning information for the first finished item and all of the one or more components of the first finished item corresponding to the first mini-data structure and planning information for the particular component in the second mini-data structure and causing rendering of all the planning information in a single view of a user interface.

16. The non-transitory machine-readable storage medium of claim 15, wherein the first message includes planning information regarding the first finished item; and wherein the operations further comprise saving the planning information regarding the first finished item in a database.

17. The non-transitory machine-readable storage medium of claim 16, wherein the database is an in-memory database.

18. The non-transitory machine-readable storage medium of claim 16, wherein the operations further comprise:

receiving a third message regarding the first finished item; and updating the saved planning information regarding the first finished item with information from the third message.

19. The non-transitory machine-readable storage medium of claim 15, wherein the operations further comprise:

receiving a fourth message regarding a second component of the second finished item;

in response to the receiving of the fourth message, updating the second mini-data structure to include the second component of the second finished item from the second data structure.

20. The non-transitory machine-readable storage medium of claim 15, wherein the planning information includes inventory levels for finished items and components of finished items.

* * * * *